US008438843B2

(12) United States Patent
Ueda et al.

(10) Patent No.: US 8,438,843 B2
(45) Date of Patent: May 14, 2013

(54) HYDRAULIC SYSTEM OF WORK MACHINE

(75) Inventors: Yoshihiro Ueda, Sakai (JP); Keisuke Miura, Izumisano (JP)

(73) Assignee: Kubota Corporation, Osaka (JP)

( * ) Notice: Subject to any disclaimer, the term of this patent is extended or adjusted under 35 U.S.C. 154(b) by 1077 days.

(21) Appl. No.: 12/417,004

(22) Filed: Apr. 2, 2009

(65) Prior Publication Data

US 2010/0071358 A1 Mar. 25, 2010

(30) Foreign Application Priority Data

Sep. 25, 2008 (JP) ................................ 2008-246246
Sep. 25, 2008 (JP) ................................ 2008-246247

(51) Int. Cl.
*F16D 31/02* (2006.01)

(52) U.S. Cl.
USPC .............................................. 60/328; 60/421

(58) Field of Classification Search .................... 60/328, 60/421, 428, 429; 91/432
See application file for complete search history.

(56) References Cited

U.S. PATENT DOCUMENTS

| | | | | |
|---|---|---|---|---|
| 5,148,676 | A * | 9/1992 | Moriya et al. | 60/429 |
| 5,692,376 | A * | 12/1997 | Miki et al. | 60/328 |
| 6,128,900 | A * | 10/2000 | Atkins et al. | 60/429 |
| 7,017,674 | B2 | 3/2006 | Bell et al. | |

* cited by examiner

*Primary Examiner* — F. Daniel Lopez
(74) *Attorney, Agent, or Firm* — The Webb Law Firm

(57) ABSTRACT

A hydraulic system of a work machine with a hydraulically controlled implement includes: an operating oil flow passage for flowing operating oil from a main pump; a boost flow oil passage for supplying operating oil to the operating oil flow passage; a connection unit for connecting the implement which is provided downstream of the confluence on the operating oil flow passage; a controller for controlling the high-flow valve; and a high-flow switch which is connected to the controller and is configured to effect or cancel a command of the amount increase on a high-flow valve. Annunciation is made when the connection unit is connected to a high-flow actuator for the implement requiring an amount increase of the operating oil, and the amount increase is effected by the high-flow valve in accordance with an operation of the high-flow switch.

4 Claims, 8 Drawing Sheets

HYDRAULIC SYSTEM OF WORK MACHINE

BACKGROUND OF THE INVENTION

1. Field of the Invention

The present invention relates to a hydraulic system of a work machine with a hydraulically controlled implement.

2. Description of the Related Art

Conventionally, there has been known a work machine provided with a main pump for supplying operating oil to a hydraulic actuator built in a hydraulically controlled implement, and a sub-pump for increasing a flow rate of the operating oil supplied to the hydraulic actuator (see U.S. Pat. No. 7,017,674B). In this hydraulic system of the work machine, to an operating oil flow passage from the main pump to the hydraulic actuator is connected a boost flow oil passage for flowing operating oil from the sub-pump, to thereby increase an amount of the operating oil to the hydraulic actuator. The control of the operating oil from the sub-pump (whether or not the operating oil is allowed to flow in the boost flow oil passage) is performed through control valves (high-flow valve).

With respect to such a work machine, in the case where a hydraulically-driven mower or the like is used in which the hydraulic actuator of a boost type (large-volume type) is driven by increasing the amount of the operating oil (boosting the flow), a large-volume type hydraulic actuator (large-volume type attachment) is connected to a connector provided in an operating oil flow passage.

On the other hand, in the case where a bucket or the like is used in which the hydraulic actuator (standard type) is driven not by increasing the amount of the operating oil, a standard type hydraulic actuator (standard type attachment) is connected likewise to the connector.

In this situation, it is not preferable that the high-flow valve be switched to the boosting side when the hydraulic actuator connected to the connector is of the standard type, since the hydraulic actuator suffers an excessive load.

Therefore, it would be desirable to provide a hydraulic system of a work machine which allows the operating oil to appropriately flow in accordance with the type of the connected hydraulic actuator.

SUMMARY OF THE INVENTION

In one aspect of the present invention, there is provided a hydraulic system of a work machine with a hydraulically controlled implement, the hydraulic system including: an operating oil flow passage configured to flow operating oil supplied from a main pump; a boost flow oil passage configured to supply operating oil from a sub-pump to the operating oil flow passage, the sub-pump being different from the main pump and being connected to the operating oil flow passage at a confluence; a connection unit which is provided downstream of the confluence on the operating oil flow passage and is configured to connect to either one of a high-flow actuator for the implement requiring an amount increase of the operating oil and a normal actuator for the implement not requiring an amount increase of the operating oil; a high-flow valve which is provided on the boost flow oil passage and configured to adjust the amount increase; a controller configured to control the high-flow valve; an annunciation device connected to the controller; a high-flow switch which is connected to the controller and configured to effect or cancel a command of the amount increase on the high-flow valve; and an annunciation control unit which is provided in the controller and configured to make annunciation through the annunciation device when the connection unit is connected to the high-flow actuator and the amount increase is effected by the high-flow valve in accordance with an operation of the high-flow switch.

In another aspect of the present invention, there is provided a hydraulic system of a work machine with a hydraulically controlled implement, the hydraulic system including: an operating oil flow passage configured to flow operating oil supplied from a main pump; a boost flow oil passage configured to supply operating oil from a sub-pump to the operating oil flow passage, the sub-pump being different from the main pump and being connected to the operating oil flow passage at a confluence; a connection unit which is provided downstream of the confluence on the operating oil flow passage and is configured to connect to either one of a high-flow actuator for the implement requiring an amount increase of the operating oil and a normal actuator for the implement not requiring an amount increase of the operating oil, including: a high-flow connection part for connecting the high-flow actuator, having a first connection part branched from the operating oil flow passage on an downstream side at a branching point, and a normal connection part for connecting the normal actuator, having a second connection part branched from the operating oil flow passage at the branching point; the confluence being provided on the first connection part and a check valve being disposed between the confluence and the branching point.

DETAILED DESCRIPTION OF THE PREFERRED EMBODIMENTS

Hereinbelow, preferred embodiments of the present invention will be described with reference to accompanying drawings. Features of one embodiment may be combined with features of another embodiment, and such combinations are encompassed in the scope of the present invention, as long as they retain coherency.

Figure 1:
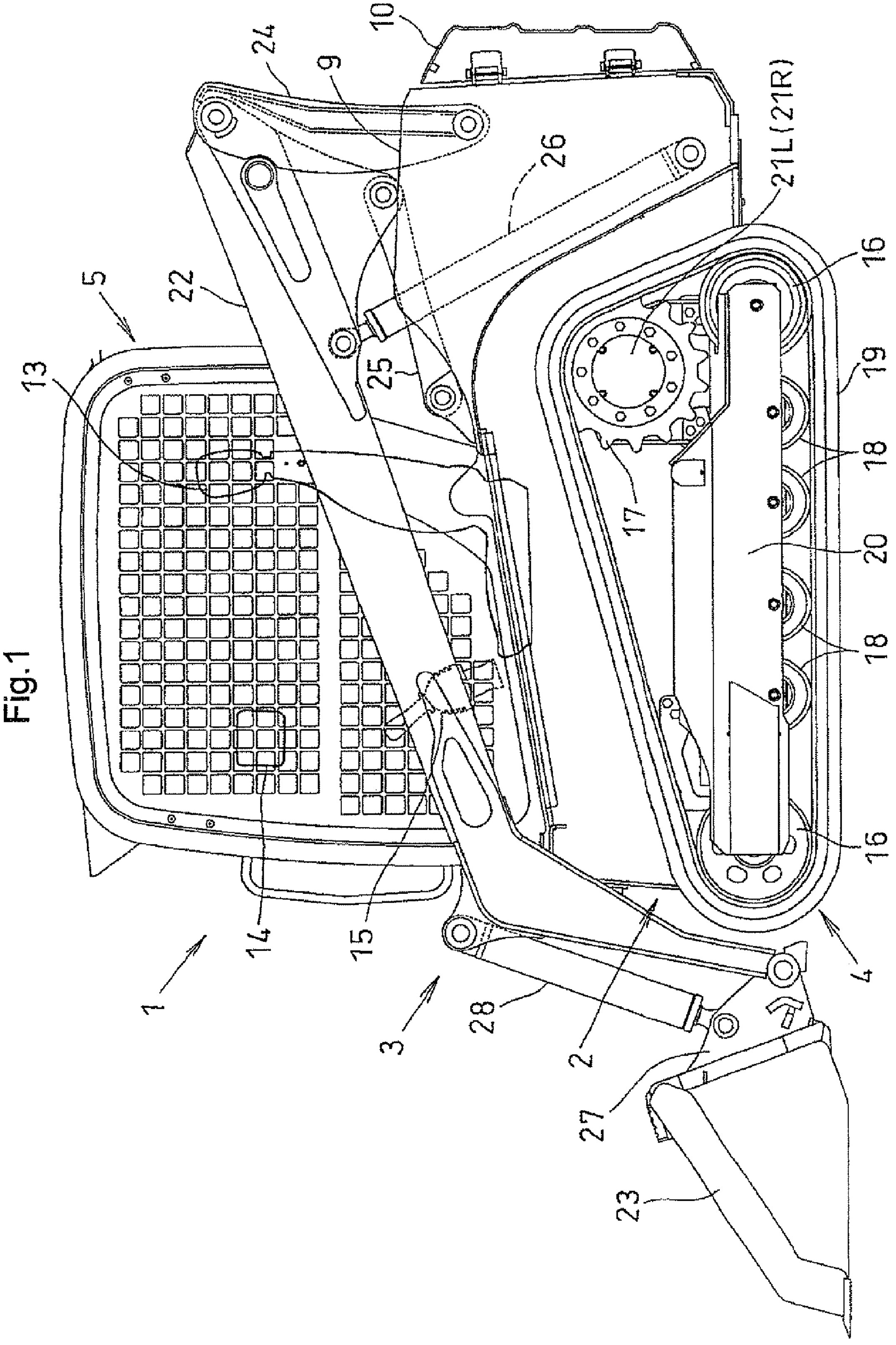
FIG. 1 is an overall side view of a work machine.
Figure 2:
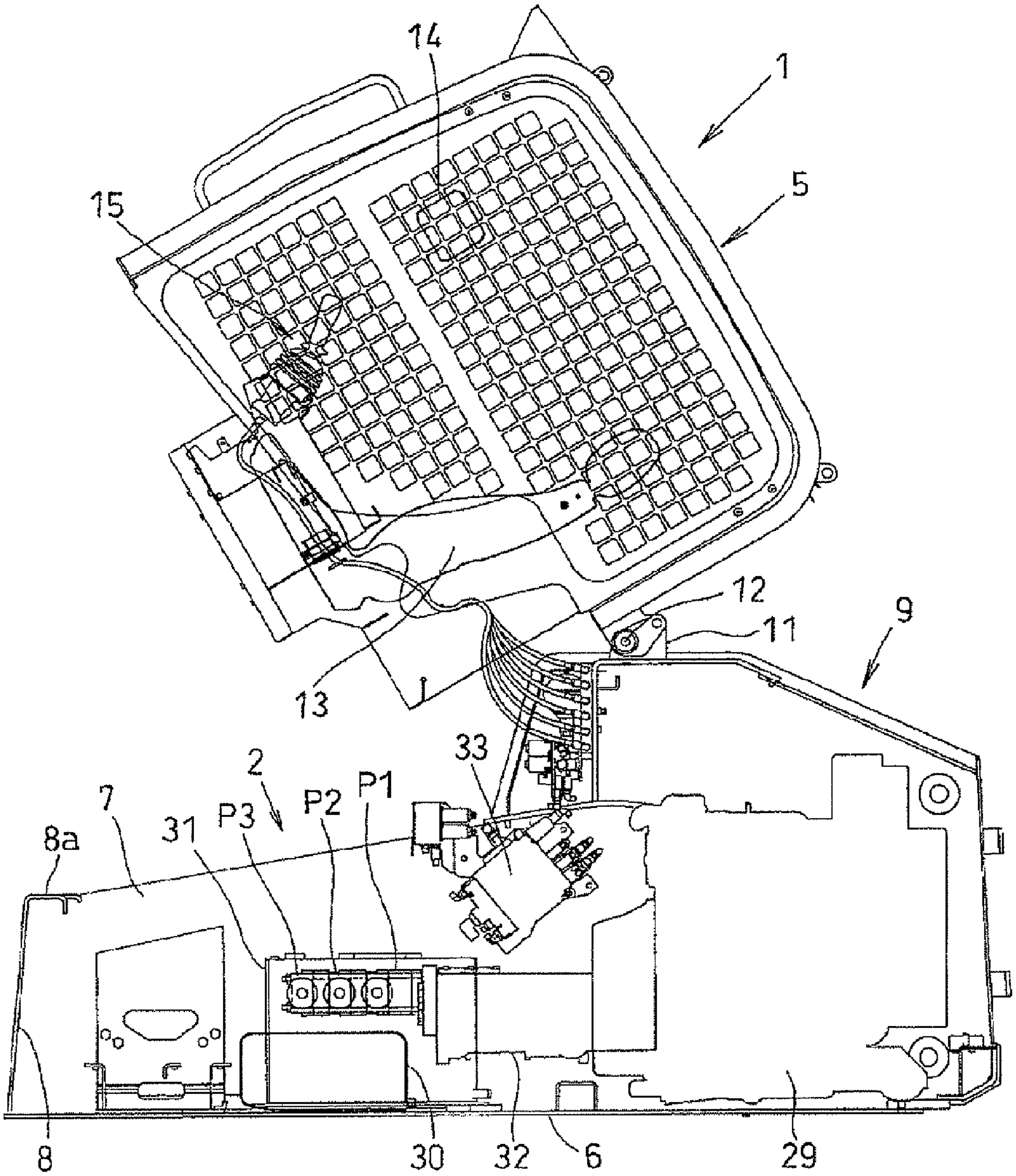
FIG. 2 is a longitudinal sectional side view of the work machine with a cabin lifted.

Referring to FIGS. 1 and 2, a work machine 1 (truck loader) according to the present invention includes: a body frame 2; a working device 3 mounted on the body frame 2; a pair of right and left traveling devices 4 supporting the body frame 2; and a cabin 5 (driver protector) mounted on an upper front side of the body frame 2.

The body frame 2 may be made of iron plate or the like, and has a bottom wall 6, a pair of right and left side walls 7, a front wall 8, support frames 9 each provided on a rear side of the corresponding right and left side walls 7, so as to give an upward opening between the side walls 7. On a rear portion of the body frame 2, a lid member 10 is provided on a rear end opening between the right and left support frames 9 in such a manner that the lid member 10 is freely opened and closed.

A lower front end of the cabin 5 is mounted on and brought into contact with an upper rim portion 8*a* of the front wall 8 of the body frame 2, and an intermediate portion in a vertical direction of a rear portion of the cabin 5 is supported by a support bracket 11 of the body frame 2, swingably about a support shaft 12 extending in a lateral direction. By upward swinging the cabin 5 about the support shaft 12, maintenance of inside of the body frame 2 and the like is facilitated.

In the cabin 5, a driver's seat 13 is mounted. On one lateral side (for example, left side) of the driver's seat 13, a device for operating the traveling devices 4,4 is disposed, and on one lateral side (for example, right side) of the driver's seat 13, an operating lever 15 as an operating device for operating the working device 3 is disposed. On a front side of the driver's seat 13, there is provided a display 14 (meter) configured to display rotational speed, water temperature, oil temperature and the like of an engine 29 of the work machine 1, and to display various annunciations or warnings.

In the cabin 5, an upper side thereof is closed with a roof, each of right and left sides is closed with a side wall with numerous square holes formed therein, an upper portion of a rear side is closed with a rear glass, a center portion in a front-rear direction of a bottom side is closed with a bottom wall. The cabin 5 as a whole is in a shape of a box with an opening on a front side, as an entrance/exit for the driver.

Each of the right and left traveling devices 4,4 is of a crawler track type provided with: a pair of front and rear driven wheels 16,16; a drive wheel 17 disposed upward and rearward between the front and rear driven wheels 16,16; track rollers 18 disposed between the front and rear driven wheels 16,16; and a crawler belt 19 with an endless track wrapped around the front and rear driven wheels 16,16, drive wheel 17 and track roller 18.

The front and rear driven wheels 16,16 and track roller 18 are attached, rotatably about the respective lateral shafts, to a track frame 20 fixed to the body frame 2. The drive wheel 17 is attached to a rotary drum of a hydraulically-driven travel motor (wheel motor) 21L (or 21R) mounted on the track frame 20, by which the drive wheel 17 is rotationally driven about a shaft extending in the lateral direction, to thereby circularly send the crawler belt 19 in a circumferential direction. With this configuration, the work machine 1 is allowed to proceed in a forward or rearward direction.

The working device 3 is provided with a pair of right and left booms 22,22 and a bucket 23 (implement) attached to front end portion of the booms 22,22.

The pair of right and left booms 22,22 are disposed on the corresponding lateral sides of the body frame 2 and the cabin 5, and an intermediate portion on a front side of the right and left booms 22,22 are connected to each other through a connecting body.

On an upper rear side of the body frame 2, a base portion (rear end portion) of each of the right and left booms 22,22 is supported swingably in the vertical direction through a first lift link 24 and a second lift link 25, so that the front end portion of the boom 22 is lifted and lowered on a front side of the body frame 2.

In addition, between the base portion of the boom 22 and a lower rear portion of the body frame 2, a lift cylinder 26, which is a double-acting hydraulic cylinder, is provided, and by synchronously extending/contracting the right and left lift cylinders 26,26, the right and left booms 22,22 swing in a vertical direction.

On the front end portion of each of the right and left booms 22,22, a bracket 27 is connected pivotally about a shaft extending in the lateral direction, and a back face of the bucket 23 is attached to the right and left brackets 27,27.

Between the bracket 27 and the intermediate portion on the front side of the boom 22, a tilt cylinder 28, which is a double-acting type hydraulic cylinder, is installed. The bucket 23 is swingable (as scooping and dumping actions) by extending and contracting the tilt cylinders 28,28.

The bucket 23 is detachably attached to the brackets 27,27 and replaceable with other attachments (hydraulically-driven work device), by which various works other than earth excavation (or other types of excavation) can be performed.

On a rear side above the bottom wall 6 of the body frame 2, the engine 29 is disposed, and on a front side, a fuel tank 30 and an operating oil tank 31 are disposed.

Frontward of the engine 29, a hydraulic driving mechanism 32 configured to drive the right and left travel motors 21L,21R is provided, frontward of the hydraulic driving mechanism 32, a first pump P1, a second pump P2 and a third pump P3 are provided. On an intermediate portion in the front-rear direction of the right side wall 7 of the body frame 2, a control valve 33 (hydraulic controller) for the working device 3 is provided.

Next, a hydraulic system of the work machine will be described in detail with reference to FIGS. 3 and 4.

Figure 3:
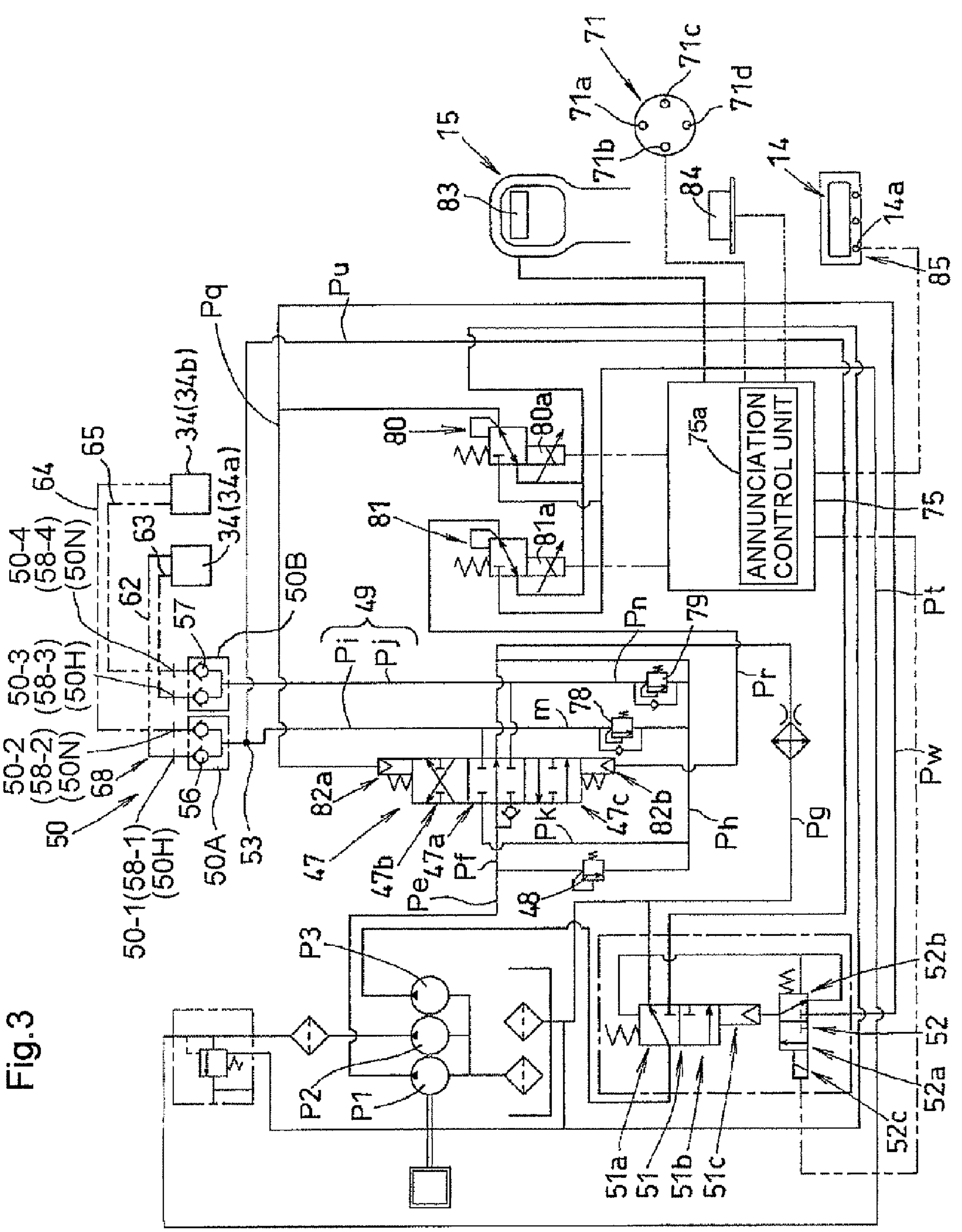
FIG. 3 a circuit diagram of a main portion of a hydraulic system especially relevant to the present invention.
Figure 4:
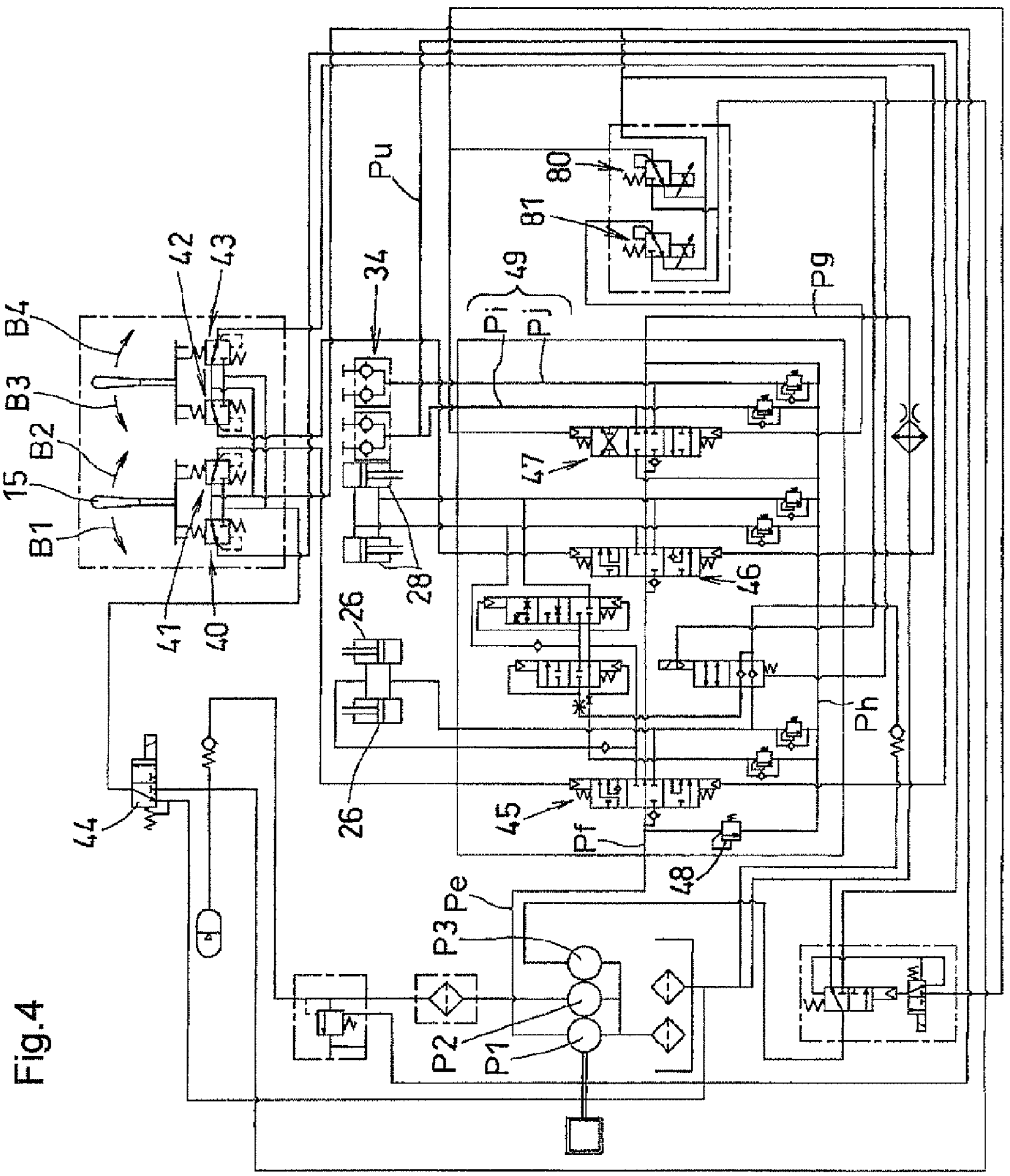
FIG. 4 is a circuit diagram of the hydraulic system.

As shown in FIGS. 3 and 4, each of the pumps P1, P2, P3 is made of a gear pump of a constant volume type, which is driven by a power from the engine 29. The first pump P1 (main pump) is configured to drive an actuator 34 built in the hydraulically-driven implement on the front end side of the lift cylinder 26, tilt cylinder 28 and boom 22. The second pump P2 is configured mainly to supply a pilot pressure. The third pump P3 (sub-pump) is configured to boost a flow rate of the operating oil (to increase an amount of the operating oil) to be supplied to the hydraulic actuator 34, when the actuator 34 built in the hydraulically-driven implement attached to the front end of the boom 22 is a hydraulic actuator requiring a large volume of the operating oil.

As shown in FIG. 4, under the operating lever 15, a boom-lifting pilot valve 40, a boom-lowering pilot valve 41, a bucket-dumping pilot valve 42 and a bucket-scooping pilot valve 43 are disposed. These pilot valves 40, 41, 42, 43 can be operated by the operating lever 15. When a work lock valve 44 made of a 2-position switching valve of an electromagnetic type is excited, pressure oil is supplied from the second pump P2 to the pilot valves 40, 41, 42, 43; when the work lock valve 44 is demagnetized, the pressure oil is not supplied from the second pump P2, disabling a function of the operating lever 15. For example, to the work lock valve 44, a demagnetization signal is sent from a locking lever operated by the driver exiting the vehicle, and an excitation signal is sent from a canceling switch.

The control valve 33 for the working device 3 is provided with a boom control valve 45 configured to control the lift cylinder 26, a bucket control valve 46 configured to control the tilt cylinder 28, an auxiliary control valve 47 (also referred to as "SP (service port) control valve") configured to control the hydraulic actuator 34 of the attachment attached to, for example, the front end of the boom 22. Each of the control valves 45, 46, 47 is made of a 3-position switching valve of a pilot type, in a direct-operated spool shape.

The boom control valve 45, bucket control valve 46 and SP control valve 47 are arranged in this order from upstream side on a supply oil passage Pf which is connected to a discharge passage Pe of the first pump P1, and the operating oil from the first pump P1 can be supplied to the lift cylinder 26, the tilt cylinder 28 and the hydraulic actuator 34 of an attachment, through the boom control valve 45, the bucket control valve 46 and the SP control valve 47, respectively.

The supply oil passage Pf is connected to a drain oil passage Pg disposed downstream of the SP control valve 47. To a portion of the supply oil passage Pf upstream of the boom control valve 45, one end of a bypass oil passage Ph is connected. The other end of the bypass oil passage Ph is connected to a portion of the supply oil passage Pf downstream of the SP control valve 47. On the bypass oil passage Ph, a relief valve 48 is disposed which is configured to set a circuit pressure of the supply oil passage Pf.

The operating device (operating lever 15) is operable from a neutral position to inclined positions, in front-rear and lateral directions and in oblique directions therebetween. By tilting the operating lever 15, each of the pilot valves 40, 41, 42, 43 is operated.

A pilot pressure is set in proportion to an operation amount of the operating lever 15 from the neutral position, and the set pilot pressure is output from each of the pilot valves 40, 41, 42, 43.

Specifically, by tilting the operating lever 15 in the rear direction (direction of an arrow B1 in FIG. 4), the boom-lifting pilot valve 40 is operated from which a pilot pressure is output. The pilot pressure acts on one of pressure receivers of the boom control valve 45 to operate the control valve 45, by which the lift cylinders 26,26 extend and the booms 22,22 are lifted at a rate in proportion to a tilting amount of the operating lever 15.

By tilting the operating lever 15 in the front direction (direction of an arrow B2 in FIG. 4), the boom-lowering pilot valve 41 is operated from which a pilot pressure is output. The pilot pressure acts on the other pressure receiver of the boom control valve 45 to operate the control valve 45, by which the lift cylinders 26,26 contract and the booms 22,22 are lowered at a rate in proportion to a tilting amount of the operating lever 15.

By tilting the operating lever 15 in the right direction (direction of an arrow B3 in FIG. 4), the bucket-dumping pilot valve 42 is operated from which a pilot pressure is output. The pilot pressure acts on one of pressure receivers of the bucket control valve 46 to operate the control valve 46, by which the tilt cylinders 28,28 extend and the bucket 23 performs dumping at a rate in proportion to a tilting amount of the operating lever 15.

By tilting the operating lever 15 in the left direction (direction of an arrow B4 in FIG. 4), the bucket-scooping pilot valve 43 is operated from which a pilot pressure is output. The pilot pressure acts on the other pressure receiver of the bucket control valve 46 to operate the control valve 46, by which the tilt cylinders 28,28 contract and the bucket 23 performs scooping at a rate in proportion to a tilting amount of the operating lever 15.

By tilting the operating lever 15 in an oblique direction, a combined movement of the lifting or lowering of the boom 22 and the scooping or dumping of the bucket 23 can be performed. As shown in FIG. 3, this hydraulic system is provided with an operating oil flow passage 49 for the operating oil supplied from the first pump P1, and a boost flow oil passage Pu for the operating oil supplied from the third pump P3.

The operating oil flow passage 49 is connected to a port of the SP control valve 47, and formed of two passages, including a first operating oil flow passage Pi and a second operating oil flow passage Pj. The SP control valve 47 is connected to an end of each of the operating oil flow passages Pi,Pj and a connection unit 50 is connected to the other end of each of the operating oil flow passages Pi,Pj.

With respect to the boost flow oil passage Pu, to one end thereof is connected the third pump P3, and to the other end thereof is connected the first operating oil flow passage Pi. In addition, on an intermediate portion of the boost flow oil passage Pu, a high-flow valve 51 is provided.

The high-flow valve 51 is made of a 2-position switching valve of a pilot type, and switchable between a non-boost position 51*a* at which discharged oil from the third pump P3 is allowed to flow through the drain oil passage Pg (prevented from flowing through the first operating oil flow passage Pi) and a boost position 51*b* at which the discharged oil from the third pump P3 is allowed to flow through the boost flow oil passage Pu. The high-flow valve 51 is switched to the non-boost position 51*a* by a spring when a pilot pressure is not applied to a pressure receiver 51*c*, and is switched to the boost position 51*b* by applying a pilot pressure to the pressure receiver 51*c*.

One end of an interlocking oil passage Pw is connected to the pressure receiver 51*c* of the high-flow valve 51, and the other end of the interlocking oil passage Pw is connected to a first pilot oil passage Pq. The interlocking oil passage Pw is provided with a high-flow switching valve 52 made of a 2-position switching valve of an electromagnetic type and switchable between an acting position 52*a* at which a pilot pressure acts on the pressure receiver 51*c* of the high-flow valve 51, and a non-acting position 52*b* at which a pilot pressure does not act on the pressure receiver 51*c*.

Therefore, when the high-flow switching valve 52 is switched to the acting position 52*a*, a pilot pressure acts on the pressure receiver 51*c* of the high-flow valve 51, shifting the high-flow valve 51 to the boost position 51*b*. As a result, the discharged oil from the third pump P3 flows through the boost flow oil passage Pu, which is combined with the operating oil in the first operating oil flow passage Pi at a junction part 53, from where to the connection unit 50 the operating oil in an increased amount flows.

When the high-flow switching valve 52 is switched to the non-acting position 52*b*, a pilot pressure does not act on the pressure receiver 51*c* of the high-flow valve 51, shifting the high-flow valve 51 to the non-boost position 51*a*. As a result, the discharged oil from the third pump P3 does not flow through the boost flow oil passage Pu, and thus the operating oil from the junction part 53 to the connection unit 50 flows exclusively from the first pump P1.

To the connection unit 50, either one of a hydraulic actuator 34*a* with a large volume in which an amount increase from the boost flow oil passage Pu is required (may also referred to as "large-volume type hydraulic actuator") and a hydraulic actuator 34*b* of a standard type which does not require an amount increase from the boost flow oil passage Pu (may also referred to as "standard type hydraulic actuator") can be connected. It should be noted that, in FIG. 3, both of the large-volume type hydraulic actuator 34*a* and the standard type hydraulic actuator 34*b* are connected to the connection unit 50 for the sake of convenience in description, but in practice, only one of the hydraulic actuators 34*a* and 34*b* is connected to the connection unit 50.

The connection unit 50 is provided with a first sub-module 50A connected to the first operating oil flow passage Pi, and the second sub-module 50B connected to the second operating oil flow passage Pj.

A flow passage in the first sub-module 50A is branched into two, each of branch passage being provided with a check valve 56. Like the first sub-module 50A, a flow passage in the second sub-module 50B is branched into two, each of branch passage being provided with a check valve 57.

Therefore, in the hydraulic system of this embodiment, the first sub-module 50A is provided with two connection ports, i.e., a first connection port 58-1 and a second connection port 58-2, and the second sub-module 50B is provided with two connection ports, i.e., a third connection port 58-3 and a fourth connection port 58-4.

In the case where an attachment with the large-volume type hydraulic actuator 34*a* (for example, brush cutter and forest mower) is connected to the connection unit 50, for example, a hydraulic hose 62 is connected to the first connection port 58-1 provided in a first connection part 50-1 of the first sub-module 50A, and a hydraulic hose 63 is connected to the third connection port 58-3 in a third connection part 50-3 of the second sub-module 50B.

In the case where an attachment with the standard type hydraulic actuator 34*b* (for example, hydraulic breaker and tilt bucket) is connected to the connection unit 50, for example, a hydraulic hose 64 is connected to the second connection port 58-2 provided in a second connection part 50-2 of the first sub-module 50A, and a hydraulic hose 65 is connected to the fourth connection port 58-4 provided in a fourth connection part 50-4 of the second sub-module 50B.

It should be noted that, regardless of which attachment (including the attachment with the large-volume type hydraulic actuator 34*a* and the attachment with the standard type hydraulic actuator 34*b*) is connected to the connection unit 50, connecting the hydraulic hose 62 or 64 to the first sub-module 50A and the hydraulic hose 63 or 65 to the second sub-module 50B will suffice.

In other words, this connection unit 50 has the connection parts 50-1, 50-2, 50-3 and 50-4, and the connection parts 50-1 and 50-3 form a high-flow connection part 50H, while the connection parts 50-2 and 50-4 form a normal flow connection part 50N.

Between the large-volume type hydraulic actuator 34*a* or standard type hydraulic actuator 34*b* and connection unit 50, a discrimination device 68 is provided which is configured to determine whether or not an increase in the oil amount in the hydraulic actuator 34 connected to the connection unit 50 is required. In other words, between the large-volume type hydraulic actuator 34*a* or standard type hydraulic actuator 34*b* and connection unit 50, the discrimination device 68 is provided which is configured to determine which of the large-volume type hydraulic actuator 34*a* and the standard type hydraulic actuator 34*b* is connected to the connection unit so.

Figure 5A:
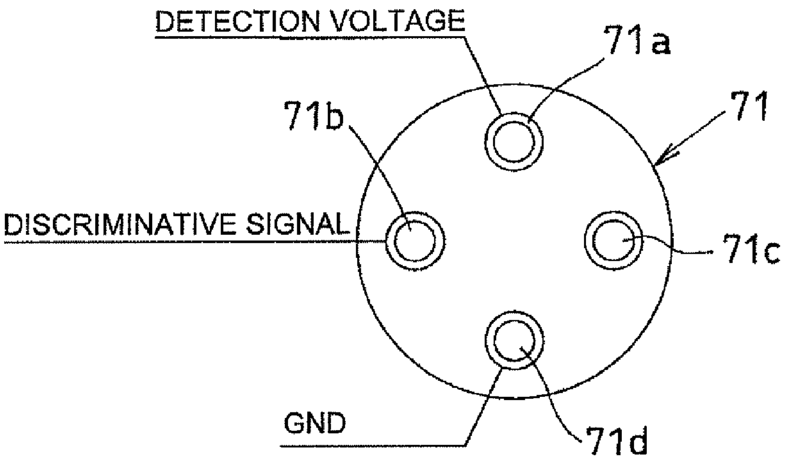
FIG. 5A is a schematic diagram showing a part of a discrimination device
Figure 5B:
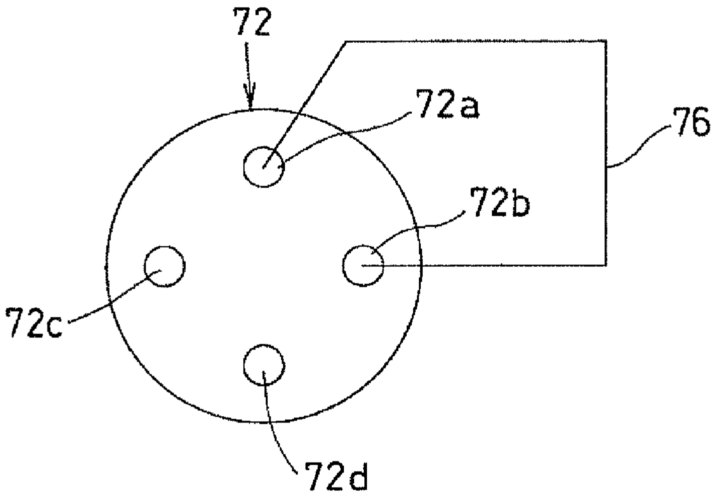
FIG. 5B is a schematic diagram showing a part of a discrimination device.
Figure 5C:
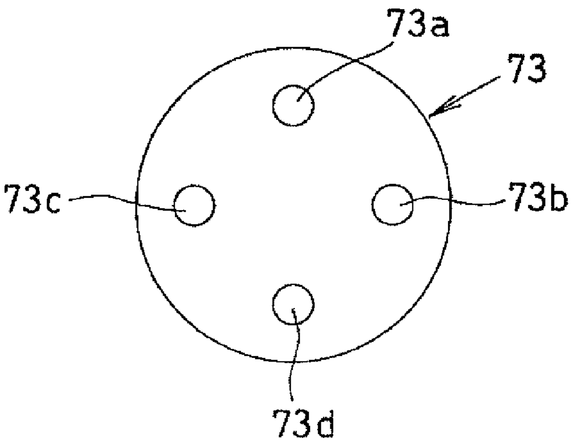
FIG. 5C is a schematic diagram showing a part of a discrimination device.

FIGS. 5A-5C show an electric connection portion between the connection unit 50 and the hydraulic actuator 34. At this electric connection portion, the discrimination device 68 is provided.

Specifically, FIG. 5A shows a connection portion of a connector 71 on a connection unit 50 side, FIG. 5B shows a connection portion of a connector 72 on a large-volume type hydraulic actuator 34*a* side, and FIG. 5C shows a connection portion of a connector 73 on a standard type hydraulic actuator 34*b* side.

As shown in FIG. 5A, the connector 71 of the connection unit 50 is provided with: a discriminative terminal 71*a* configured to output a voltage for detection (detection voltage) to the connector 72 or 73 of the hydraulic actuator 34 when connected to the connector 72 or 73 of the hydraulic actuator 34; and a discriminative terminal 71*b* configured to output a discriminative signal to a controller 75 when connected to the connector 72 or 73 of the hydraulic actuator 34.

The connector 71 of the connection unit 50 is also provided with: a power terminal 71*c* configured to supply power to the hydraulic actuator 34 when the connector 72 or 73 of the hydraulic actuator 34 is connected; and a GND terminal 71*d*.

As shown in FIG. 5B, the connector 72 of the large-volume type hydraulic actuator 34*a* is provided with: a high-flow first terminal 72*a* to be connected to the discriminative terminal 71*a*; and a high-flow second terminal 72*b* to be connected to the discriminative terminal 71*b*.

The high-flow first terminal 72*a* and the high-flow second terminal 72*b* are connected through a lead wire 76 or the like to each other, and short-circuited. The connector 72 of the large-volume type hydraulic actuator 34*a* is also provided with: a power terminal 72*c* to be connected to the power terminal 71*c* of the connection unit 50; and a GND terminal 72*d* to be connected to the GND terminal 71*d* of the connection unit 50.

As shown in FIG. 5C, the connector 73 of the standard type hydraulic actuator 34*b* is provided with: a normal first terminal 73*a* to be connected to the discriminative terminal 71*a*; and a normal second terminal 73*b* to be connected to the discriminative terminal 71*b*.

The normal first terminal 73*a* and the normal second terminal 73*b* are not connected, and open-circuited The connector 73 of the standard type hydraulic actuator 34*b* is also provided with: a power terminal 73*c* to be connected to the power terminal 71*c* of the connection unit 50; and a GND terminal 73*d* to be connected to the GND terminal 71*d* of the connection unit 50.

When the large-volume type hydraulic actuator 34*a* is connected to the connection unit 50, the connector 72 of the large-volume type hydraulic actuator 34*a* is connected to the connector 71 of the connection unit 50. With this connection, a detection voltage (e.g., 12V) of a discriminative signal S1 is applied from the discriminative terminal 71*a* to the high-flow first terminal 72*a*, and the detection voltage (12V) is output to the discriminative terminal 71*b* through the high-flow second terminal 72*b* short-circuited to the high-flow first terminal 72*a*.

On the other hand, when the standard type hydraulic actuator 34*b* is connected to the connection unit 50, the connector 73 of the standard type hydraulic actuator 34*b* is connected to the connector 71 of the connection unit 50. With this connection, a detection voltage (e.g., 12V) of the discriminative signal S1 is applied from the discriminative terminal 71*a* to the normal first terminal 73*a*. In this case, since the normal first terminal 73*a* and the normal second terminal 73*b* are not connected, the detection voltage (12V) input to the normal first terminal 73*a* is not output to the discriminative terminal 71*b* through the normal second terminal 73*b*, and the voltage of the discriminative terminal 71*b* of the connection unit 50 remains 0V.

Figure 6:
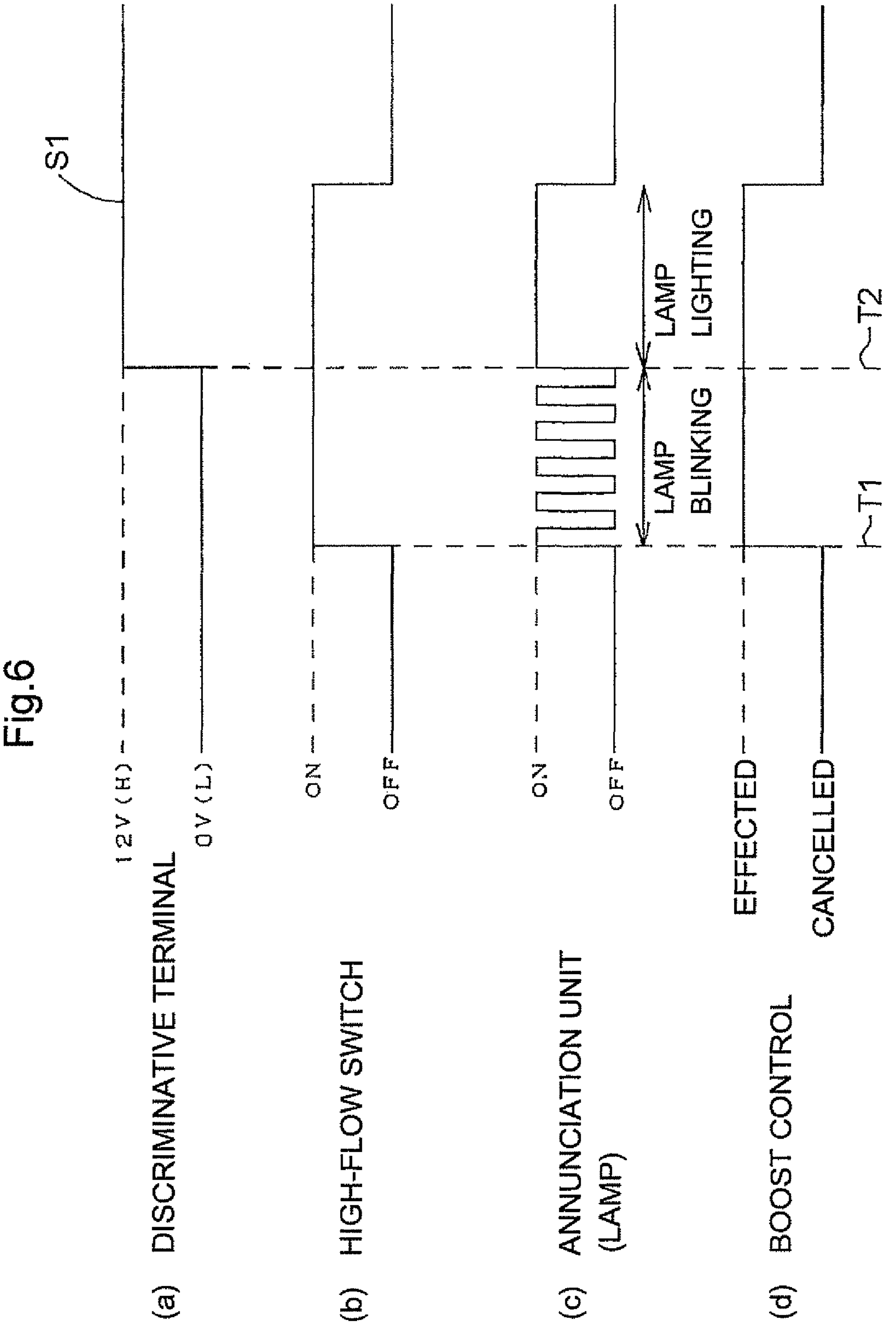
FIG. 6 shows change charts of signals with respect to an annunciation device.

In other words, as shown in FIG. 6, when the large-volume type hydraulic actuator 34*a* is connected to the connection unit 50, a voltage of the discriminative terminal 71*b* of the connection unit 50 becomes 12V (high voltage H), which is the same as the detection voltage, and when the standard type hydraulic actuator 34*b* is connected to the connection unit 50, a voltage of the discriminative terminal 71*b* of the connection unit 50 becomes 0V (low voltage L), which is different from the detection voltage.

Depending on whether the voltage of the discriminative terminal 71*b* of the connection unit 50 (voltage of the discriminative signal S1), during the connection of the hydraulic actuator 34 with the connection unit 50, is the high voltage H or the low voltage L, it can be determined which of the large-volume type hydraulic actuator 34*a* or the standard type hydraulic actuator 34*b* is connected to the connection unit 50.

The SP control valve 47 is connected to the bypass oil passage Ph through a drain oil passage Pk. The first operating oil flow passage Pi is connected to the bypass oil passage Ph through a first escape passage Pm. The second operating oil flow passage Pj is connected to the bypass oil passage Ph through a second escape passage Pn, and relief valves 78,79 are disposed on the escape passages Pm,Pn, respectively.

The SP control valve 47 is switchable from a neutral position 47*a* to a first position 47*b* or a second position 47*c* by utilizing a pilot pressure, which position is returned to the neutral position 47*a* by a spring.

When the SP control valve 47 is switched to the first position 47*b*, the operating oil from the first pump P1 is supplied through the first operating oil flow passage Pi to the hydraulic actuator 34 of the attachment, and at the same time oil returned from the hydraulic actuator 34 of the attachment flows through the second operating oil flow passage Pj to the drain oil passage Pk. When switched to the second position 47*c*, the operating oil from the first pump P1 is supplied through the second operating oil flow passage Pj to the hydraulic actuator 34 of the attachment, and at the same time oil returned from the hydraulic actuator 34 of the attachment flows through the first operating oil flow passage Pi to the drain oil passage Pk.

Therefore, with respect to the pair of the operating oil flow passages Pi,Pj, when one becomes a passage that supplies the operating oil to the hydraulic actuator 34, the other becomes a passage through which the oil returned from the hydraulic actuator 34 flows.

The SP control valve 47 is controllable with respect to its opening degree depending on a pilot pressure acting on pressure receivers 82*a*,82*b* (i.e., the SP control valve 47 is a valve capable of continuously control a flow rate), and thus by a pilot pressure acting on either one of the pressure receivers 82*a* and 82*b*, the flow rate of the operating oil supplied from the first operating oil flow passage Pi or the second operating oil flow passage Pj to the hydraulic actuator 34 is controlled.

The SP control valve 47 is controllable by a pair of auxiliary operation valves 80,81 (also referred to as "SP operation valve") each made of a pilot valve of a proportional solenoid type. The SP operation valve 80 is connected to the pressure receiver 82*a* on one side of the SP control valve 47 through a first pilot oil passage Pq, while the SP operation valve 81 is connected to the pressure receiver 82*b* on the other side of the SP control valve 47 through a second pilot oil passage Pr. It should be noted that the pair of the SP operation valves 80,81 can be supplied with pressure oil from the second pump P2 through a pilot pressure supply oil passage Pt.

The operation of the SP operation valves 80,81, i.e., the operation of the SP control valve 47, can be performed by controlling the controller 75. Likewise, the operation of the high-flow switching valve 52, i.e., the operation of the high-flow valve 51, can be performed by controlling the controller 75.

To an input side of the controller 75 is connected a slide switch 83 as an operating device which is provided on a top portion of the operating lever 15 and is slidable in the lateral direction, and is also connected a high-flow switch 84 in a form of a push-button which is provided in the vicinity of the driver's seat 13. Further to the input side of the controller 75 is connected the discrimination device 68, i.e., discriminative terminal 71*b* of the connector 71 of the connection unit 50.

On the other hand, to an output side of the controller 75 is connected a solenoid 80*a* of the SP operation valve 80, so as a solenoid 81*a* of the SP operation valve 81. Further to the output side of the controller 75 is connected a solenoid 52*c* of the high-flow switching valve 52, and is also connected an annunciation device 85 which is provided in the vicinity of the driver's seat 13. One example of the annunciation device 85 is a lamp 14*a* provided in on the display (meter) 14 near by the driver's seat 13.

When the slide switch 83 as an operating device connected to the controller 75 is slid to one side in the lateral direction, an operation signal corresponding to the operation amount of the slide switch 83 is input to the controller 75, from which a command signal corresponding to the operation amount of the slide switch 83 is output to the SP operation valve 80, to thereby excite the solenoid 80*a* of the SP operation valve 80. As a result, a pilot pressure proportional to the operation amount of the slide switch 83 is output from the SP operation valves 80, and the pilot pressure acts on the pressure receiver 82*a* of the SP control valve 47 through the first pilot oil passage Pq, to thereby shift the SP control valve 47 to the first position 47*b* in proportion to the operation amount of the slide switch 83.

When the slide switch 83 is slid to the other side in the lateral direction, an operation signal corresponding to the operation amount of the slide switch 83 is input to the controller 75, from which a command signal is output to the SP operation valve 81, to thereby excite the solenoid 81 a of the SP operation valve 81. As a result, a pilot pressure proportional to the operation amount of the slide switch 83 is output from the SP operation valve 81, and the pilot pressure acts on the pressure receiver 82*b* of the SP control valve 47 through the second pilot oil passage Pr, to thereby shift the SP control valve 47 to the second position 47*c* in proportion to the operation amount of the slide switch 83.

When the high-flow switch 84 is pushed, a signal indicating that the high-flow switch 84 is turned on is input to the controller 75. When the ON-signal of the high-flow switch 84 is input to the controller 75, the solenoid 52*c* of the high-flow switching valve 52 is continuously excited, by which the high-flow switching valve 52 is switched to the acting position 52*a*. In this case, when the slide switch 83 is operated, the operating oil with a flow rate being controlled by the high-flow valve 51 (the operating oil in an amount proportional to the operation amount of the slide switch 83) flows from the sub-pump P3 through the boost flow oil passage Pu to the first operating oil flow passage Pi, to thereby increase an amount of the operating oil. In other words, when the high-flow switch 84 is pushed, a boost control of the high-flow valve 51 becomes effected, to thereby increase an amount of the operating oil in the first operating oil flow passage Pi. It should be noted that, when the boost control of the high-flow valve 51 is effected, and the high-flow switch 84 is pushed again, the excitation of the solenoid 52*c* of the high-flow switching valve 52 by the controller 75 is terminated to thereby cancel the boost control of the high-flow valve 51.

An annunciation control unit 75*a* built in the controller 75 is configured to activate the annunciation device 85 to give warning, when the hydraulic hose of the standard type hydraulic actuator 34*b* is connected to the connection unit 50 and the boost control by the high-flow valve 51 is effected by the high-flow switch 84.

Specifically, referring to FIG. 6, when the standard type hydraulic actuator 34*b* is connected to the connection unit 50 with the discriminative signal S1 being 0V (low voltage L) and the worker presses the high-flow switch 84 (ON) to effect the boost control of the high-flow valve 51 (at a point T1), the controller 75 activates the annunciation device 85 to give warning (to blink the lamp 14*a* of the display 14). With this blinking of the lamp 14*a*, it is notified that boosting of the high-flow valve 51 is about to be performed even though the standard type hydraulic actuator 34*b* is connected to the connection unit 50.

In other words, the controller 75 is configured to inform the worker seated in the driver's seat 13 by blinking the lamp 14*a* that a mode of the operating oil in the hydraulic actuator 34 (suitable for the standard type hydraulic actuator 34*b* or large-volume type hydraulic actuator 34*a*) does not match a flow rate boosting or non-boosting) of the operating oil during an operation of the high-flow valve 51.

With this blinking of the lamp 14*a*, the worker can instantly notice that the boost control by the high-flow valve 51 should be cancelled. The worker who has been informed can press the high-flow switch 84 again to cancel the boost control of the high-flow valve 51, and then slide the slide switch 83 to perform working without boosting the standard type hydraulic actuator 34*b*.

When the large-volume type hydraulic actuator 34*a* is connected to the connection unit 50 with the discriminative signal S1 being 12V (high voltage H), and the worker presses the high-flow switch 84 (ON) to effect the boost control of the high-flow valve 51 (at a point T2), the controller 75 continuously lights the lamp 14*a* of the display 14 to notify that the boost control by the high-flow valve 51 can be performed. With this lighting of the lamp 14*a*, it is notified that boosting of the high-flow valve 51 is about to be performed when the large-volume type hydraulic actuator 34*a* is connected to the connection unit 50.

In other words, the controller 75 is configured to inform the worker seated in the driver's seat 13 by lighting of the lamp 14*a* that a mode of the operating oil in the hydraulic actuator 34 (suitable for the standard type hydraulic actuator 34*b* or large-volume type hydraulic actuator 34*a*) matches a flow rate (boosting or non-boosting) of the operating oil during an operation of the high-flow valve 51.

With this lighting of the lamp 14*a*, the worker can notice that the boost control can be performed with the high-flow valve 51 with the large-volume type hydraulic actuator 34*a* being connected to the connection unit 50. The worker who has been informed can slide the slide switch 83 to perform working with boosting the large-volume type hydraulic actuator 34*a*.

In the embodiment as described above, the annunciation device 85 is provided with the lamp 14*a*. However the present invention is not limited to this embodiment, and the annunciation device 85 may make notification by voice or by vibration.

In the embodiment above, when the boost control is effected, a flow rate of the operating oil at the high-flow valve 51 is set proportional to the operation amount of the slide switch 83. However, the present invention is not limited to this embodiment.

Figure 7:
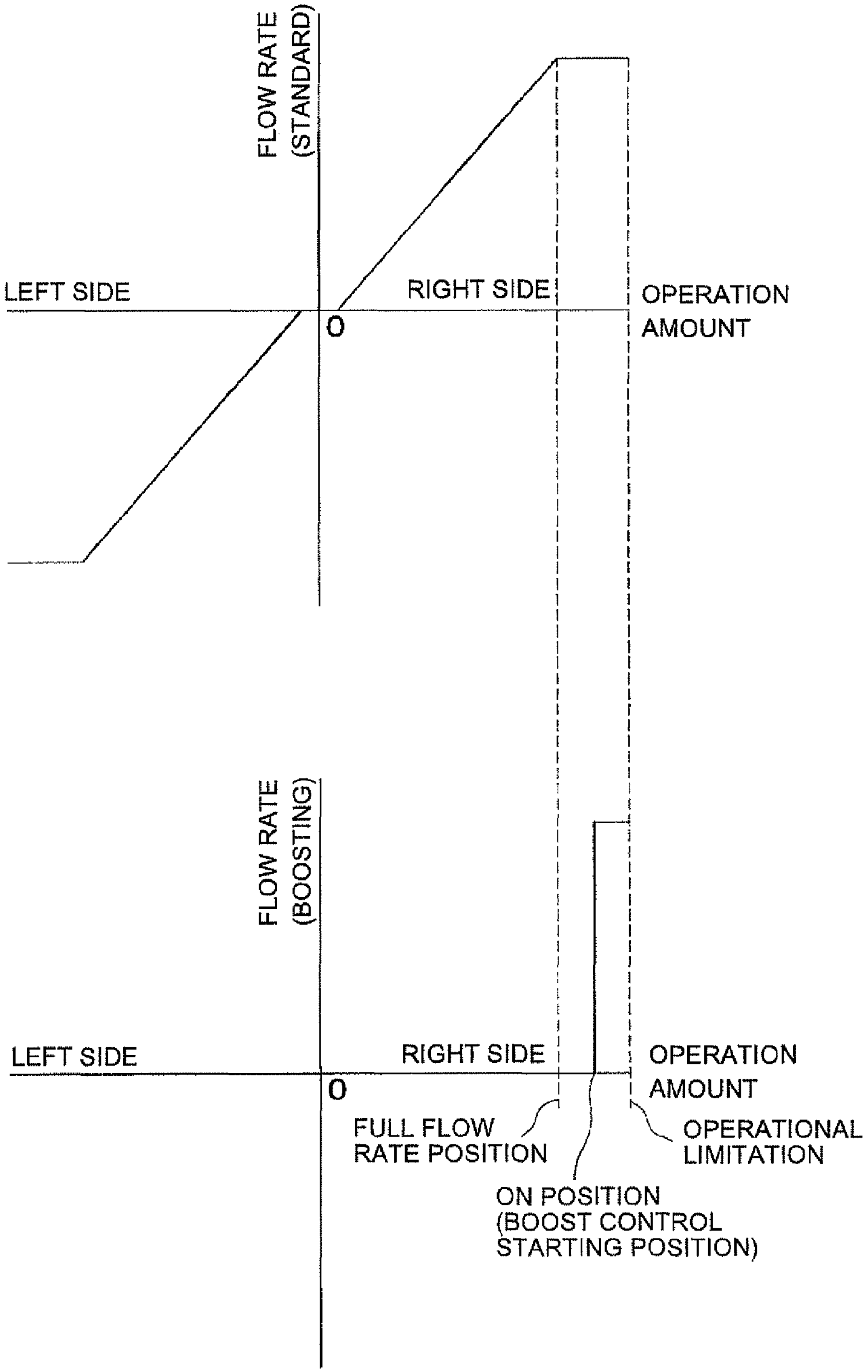
FIG. 7 shows a graph depicting a relationship between flow rate change of standard operating oil and an operating device, and a graph depicting a relationship between boosted flow rate of the operating oil and the operating device.

Specifically, as shown in FIG. 7, when the boost control is effected, a flow rate of the operating oil in the SP control valve 47 is gradually increased in accordance with an operation amount of the operating device, and at the same time, at a point at which the operating device is approximately maximally moved in an operation direction (for example approximately 90%, full flow rate position) the SP control valve 47 is fully opened (a standard flow rate of the operating oil is maximized).

On the other hand, as shown in FIG. 7, when the boost control is effected, the high-flow valve 51 is kept closed to thereby block the increase of the operating oil until the operating device passes the fall flow rate position and the high-flow valve 51 is fully opened after the full flow rate position (a boosting flow rate of the operating oil is maximized). More specifically, with respect to the operation of the operating device, a position to turn on the high-flow valve 51 (ON position, or boost control starting position) is provided between the full flow rate position at which the flow rate of the operating oil on a standard side is maximized and a position of an operational limitation of the operating device (physically ultimate position). The amount of the operating oil to be increased is set maximum (amount of the operating oil flowing through the high-flow valve 51 becomes maximum) when the operating device reaches the ON position (boost control starting position).

With this configuration, during the high-flow control (boost control), the SP control valve 47 does not fail to be fully opened, and thus the high-flow control can be surely performed by operating the operating device to the operational limitation, without causing blow-up of a relief valve or the like.

The structures of the high-flow valve 51, high-flow switching valve 52, controller 75 and hydraulic circuit are not limited to those in the embodiment above, as long as the high-flow valve 51 can be properly operated. For example, the controller 75 may directly shift the high-flow valve 51 to the boost position 51*b* by an electric signal when the operating device is at an ON position. Alternatively, the high-flow valve 51 may be shifted to the boost position 51*b* by exciting the solenoid of the high-flow switching valve 52 to thereby applying a pilot pressure to the high-flow valve 51. However, it should be noted that the configuration is made in such a manner that, upon applying a pilot pressure to the high-flow valve 51, the flow rate of the pilot oil becomes maximum at the ON position of the operating device, instead of making the flow rate proportional to an operation amount of the operating device.

Figure 8:
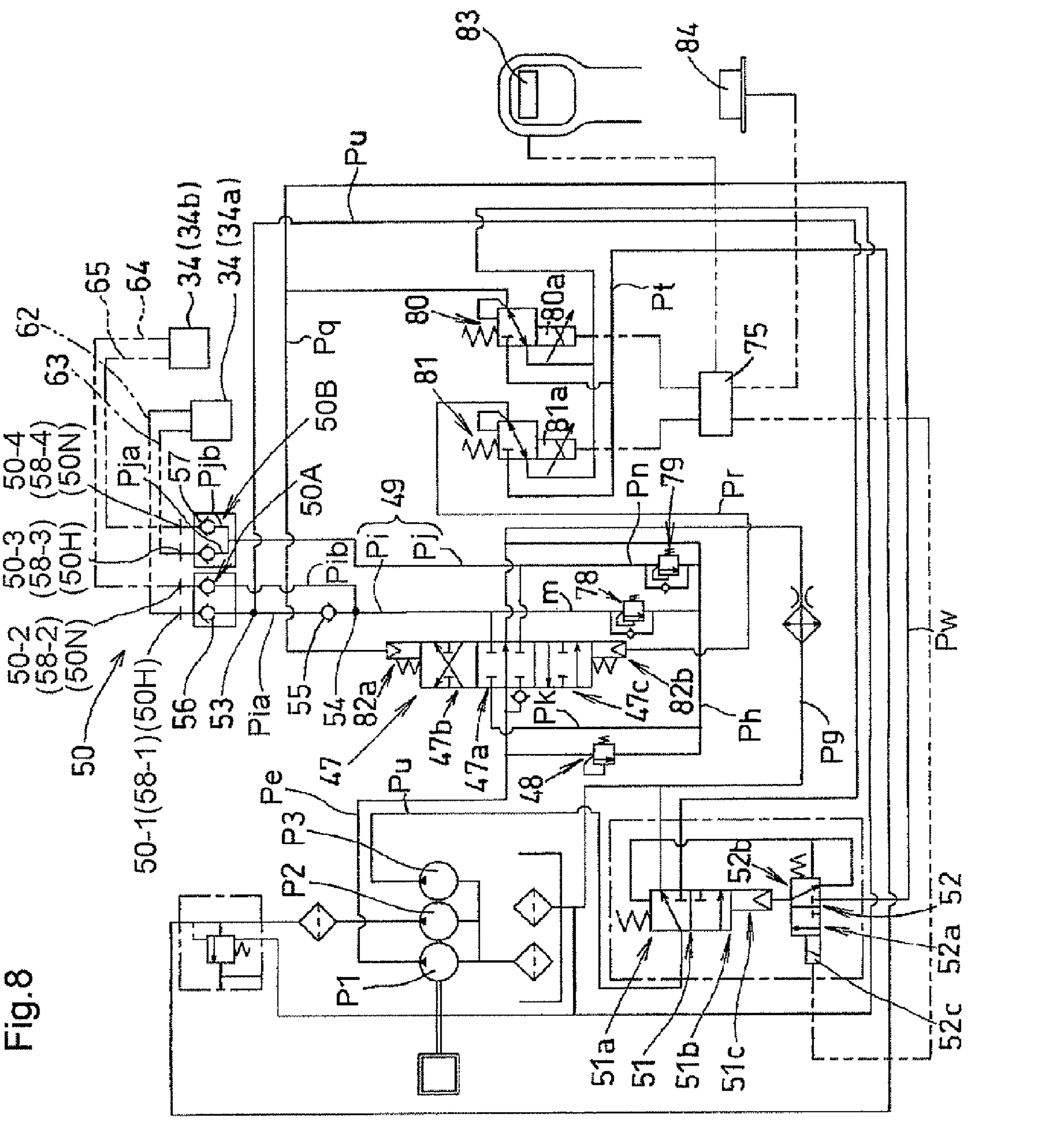
FIG. 8 is a circuit diagram of another embodiment corresponding to FIG. 3.

FIG. 8 shows a modified version of the hydraulic circuit shown in FIG. 3.

Also in this modified version, the operating oil flow passage 49 is connected to a port of the SP control valve 47, and formed of two passages, including the first operating oil flow passage Pi and the second operating oil flow passage Pj. The SP control valve 47 is connected to an end of each of the operating oil flow passages Pi,Pj, and the connector 50 is connected to the other end of each of the operating oil flow passages Pi,Pj.

An intermediate portion of the first operating oil flow passage Pi bifurcates into a first branch passage Pia and a second branch passage Pib, and an end portion of a first branch passage Pia is connected to the connector 50, while an end portion of a second branch passage Pib is also connected to the connector 50. On the first branch passage Pia, i.e., between a branch part 54 and the connector 50, is provided with a check valve 55. The boost flow oil passage Pu is connected to the first branch passage Pia, but not to the second branch passage Pib of the first operating oil flow passage Pi. Therefore, the operating oil which is discharged from the main pump P1 and whose flow rate is controlled at the SP control valve 47 branches at the branch part 54 of the first operating oil flow passage Pi, and flows into both the first branch passage Pia and the second branch passage Pib. In addition, the operating oil from the SP control valve 47 flowing through the first branch passage Pia converges with the operating oil discharged from the sub-pump P3 through the boost flow oil passage Pu, at the junction part 53 and the converged oil flows to the connector 50.

In the second operating oil flow passage Pj, an end portion bifurcates into two, like the first operating oil flow passage Pi. An end portion of a first branch passage Pja of the second operating oil flow passage Pj is connected to the connector 50, and an end portion of a second branch passage Pjb of the second operating oil flow passage Pj is also connected to the connector 50.

The connector 50 is provided with the first connection part (quick coupling) 50-1 connected to the first branch passage Pia of the first operating oil flow passage Pi; the second connection part (quick coupling) 50-2 connected to the second branch passage Pib of the first operating oil flow passage Pi; the third connection part (quick coupling) 50-3 connected to the first branch passage Pja of the second operating oil flow passage Pj; and the fourth connection part (quick coupling) 50-4 connected to the second branch passage Pjb of the second operating oil flow passage Pj.

Each of the first connection part 50-1 and third connection part 50-3 is provided with the check valve 56, and each of the second connection part 50-2 and fourth connection part 50-4 is provided with the check valve 57. When respective hydraulic hoses of the hydraulic actuator 34 are connected to the connection parts 50-1, 50-2, 50-3, 50-4, the check valves 56,57 are opened to allow the operating oil to flow, and when the hydraulic hoses of the hydraulic actuator 34 are detached from the connection parts 50-1, 50-2, 50-3, 50-4, the check valve 56,57 act to prevent the operating oil from flowing.

The first connection part 50-1 and third connection part 50-3 are for connecting an attachment with the large-volume type hydraulic actuator 34*a* (for example, brush cutter and forest mower), and may be collectively referred to as a high-flow connection part 50H.

Specifically, for example, the hydraulic hose 62 of the large-volume type hydraulic actuator 34*a* is connected to the first connection port 58-1 of the first connection part 50-1 and the hydraulic hose 63 of the large-volume type hydraulic actuator 34*a* is connected to the third connection port 58-3 of the third connection part 50-3, to thereby connect the large-volume type hydraulic actuator 34*a* to the high-flow connection part 50H.

The second connection part 50-2 and fourth connection part 50-4 are for connecting an attachment with the standard type hydraulic actuator 34*b* (for example, tilt bucket and hydraulic breaker) to the connector 50, and have a second connection port 58-2 and a fourth connection port 58-4, respectively, and may be collectively referred to as a normal connection part 50N.

In the operating oil flow passage 49, the intermediate portion of the first operating oil flow passage Pi bifurcates, and one of the branched passage forms the high-flow connection part 50H, while the other of the branched passage forms the normal connection part 50N. Between the branch part 54 and the high-flow connection part 50H, the boost flow oil passage Pu is connected which is for providing the operating oil from the sub-pump P3 and to increase the oil amount. The flow from the boost flow oil passage Pu converges with the operating oil flow passage 49 (first operating oil flow passage Pi), while the operating oil flow passage 49 is provided with the check valve. The flow portion of the high-flow connection part 50H and that in the normal connection part 50N are made different from each other (size of the connection portion is made different). Therefore, the high-flow connection part 50H is connectable only to the large-volume type hydraulic actuator 34*a*, but not to the standard type hydraulic actuator 34*b*, by which the connection error can be surely prevented.

In the case of the standard type hydraulic actuator 34*b* connected to the connector 50, even though the operation for increasing the oil amount is performed by turning on the high-flow switch 84 and sliding the slide switch 83, the increased operating oil is prevented from flowing into the standard type hydraulic actuator 34*b*, and only the operating oil in the standard amount flows into the standard type hydraulic actuator 34*b*. In other words, the operating oil in an amount corresponding to the hydraulic actuator 34 flows therethrough, and thus even when the high-flow operation is performed, it can be prevented from the standard type hydraulic actuator 34*b* from experiencing an excessive load.

What is claimed is:

1. A hydraulic system of a work machine with a hydraulically controlled implement, the hydraulic system comprising:

an operating oil flow passage configured to flow operating oil supplied from a main pump;

a boost flow oil passage configured to supply operating oil from a sub-pump to the operating oil flow passage, the sub-pump being different from the main pump and being connected to the operating oil flow passage at a confluence;

a connection unit provided downstream of the confluence on the operating oil flow passage, wherein the connection unit is configured to connect to either one of a high-flow actuator for the implement requiring an amount increase of the operating oil and a normal actuator for the implement not requiring an amount increase of the operating oil;

a high-flow valve which is provided on the boost flow oil passage and configured to adjust the amount increase;

a controller configured to control the high-flow valve;

an annunciation device connected to the controller;

a high-flow switch which is connected to the controller and configured to effect or cancel a command of the amount increase on the high-flow valve;

an annunciation control unit which is provided in the controller and configured to make annunciation through the annunciation device when the connection unit is connected to the normal actuator and the amount increase is effected by the high-flow valve in accordance with an operation of the high-flow switch; and a discrimination device configured to output a discriminative signal for discriminating whether the actuator connected to the connection unit is the high-flow actuator or the normal actuator, the discrimination device outputting the discriminative signal to the controller when the actuator is connected to the connection unit, the controller making annunciation through the annunciation device when the discriminative signal indicates that the normal actuator is connected, wherein the connection unit comprises a high-flow connection part for connecting the high-flow actuator, and a normal connection part for connecting the normal actuator, the operating oil flow passage bifurcates on a downstream side at a branching point into a first art and a second part, the first part includes a first connection part that serves as a component of the high-flow connection part, and the second part includes a second connection part that serves as a component of the normal connection part, and the confluence is provided between the first connection part and the branching point, and a check valve is disposed between the confluence and the branching point.

2. The hydraulic system according claim 1, wherein the discrimination device comprises:

a discrimination first terminal which is provided in the connection unit and is configured to receive a voltage for the discriminative signal;

a discrimination second terminal which is provided on the connection unit and is configured to output the discriminative signal to the controller;

a normal first terminal which is provided in the normal actuator and is to be connected to the discrimination first terminal of the connection unit;

a normal second terminal which is provided in the normal actuator, is open-circuited to the normal first terminal, and is configured to output the discriminative signal corresponding to the normal actuator to the discrimination second terminal;

a high-flow first terminal which is provided in the high-flow actuator and is to be connected to the discrimination first terminal of the connection unit; and a high-flow second terminal which is provided on the high-flow actuator, is short-circuited to the high-flow first terminal, and is configured to output the discriminative signal corresponding to the high-flow actuator to the discrimination second terminal.

3. The hydraulic system according to claim 1, wherein the annunciation control unit is configured to make a different annunciation through the annunciation device when the connection unit is connected to the normal actuator and the amount increase is not effected by the high-flow valve in accordance with an operation of the high-flow switch.

4. A hydraulic system of a work machine with a hydraulically controlled implement, the hydraulic system comprising:

an operating oil flow passage configured to flow operating oil supplied from a main pump;

a boost flow oil passage configured to supply operating oil from a sub-pump to the operating oil flow passage, the sub-pump being different from the main pump and being connected to the operating oil flow passage at a confluence;

a connection unit which is provided on the operating oil flow passage and is configured to connect to either one of a high-flow actuator for the implement requiring an amount increase of the operating oil and a normal actuator for the implement not requiring an amount increase of the operating oil, comprising:

a high-flow connection part for connecting the high-flow actuator, having a first connection part that is positioned from a first part that is branched from the operating oil flow passage on a downstream side at a branching point, and a normal connection part for connecting the normal actuator, having a second connection part that is positioned from a second part that is branched from the operating oil flow passage at the branching point;

the confluence being provided between the first connection part and the branching point, and a check valve being disposed between the confluence and the branching point.

* * * * *

UNITED STATES PATENT AND TRADEMARK OFFICE

CERTIFICATE OF CORRECTION

PATENT NO. : 8,438,843 B2
APPLICATION NO. : 12/417004
DATED : May 14, 2013
INVENTOR(S) : Yoshihiro Ueda et al.

It is certified that error appears in the above-identified patent and that said Letters Patent is hereby corrected as shown below:

In the Claims:

Column 14, Line 60, Claim 2, delete “according” and insert -- according to --

Signed and Sealed this
Third Day of September, 2013

Teresa Stanek Rea
*Acting Director of the United States Patent and Trademark Office*